April 19, 1932.  H. SINCLAIR  1,855,032
LOAD EQUALIZING MACHINERY
Filed May 24, 1928  2 Sheets-Sheet 1

Inventor
Harold Sinclair

April 19, 1932.  H. SINCLAIR  1,855,032
LOAD EQUALIZING MACHINERY
Filed May 24, 1928  2 Sheets-Sheet 2

Patented Apr. 19, 1932

1,855,032

UNITED STATES PATENT OFFICE

HAROLD SINCLAIR, OF SURBITON, ENGLAND

LOAD EQUALIZING MACHINERY

Application filed May 24, 1928, Serial No. 280,344, and in Great Britain July 6, 1927.

This invention relates to load equalizing machinery for use for example in connection with machinery subject to fluctuating loads having heavy intermittent peaks such as for example rolling mills, winding engines and the like and more particularly to machinery in which speed variation of the driven machine is desired in circumstances when a constant speed prime mover is the source of motive power and wherein a constant full load torque, or an adjustable full load torque varying in predetermined accordance with the load, speed, or other function of the connected machinery is required.

When the driven machinery of the type above referred to rotates in one direction without reversal, the flywheel is usually connected to the driving motor direct or through suitable transmission gears. In the case of reversing drives, the flywheel cannot serve as a load equalizing means if connected to the reversing shaft, and in those instances where a variable transmission is introduced between the driving motor and the driven machine, the flywheel is then usually coupled to the continuously running driving motor.

In all such cases except when the inherent load/speed characteristic of the driving motor is correct, means must be provided to enable the flywheel to lose speed during peak loads so that it may give out its stored energy to the degree required to maintain a more or less constant load on the driving motor. Conversely the speed of the flywheel must be increased when the load falls below a predetermined amount so as to store energy therein in readiness for the next peak load.

When the machinery is driven by alternating current electric power, the driving motor is usually an induction motor since this type of machine is readily capable of giving the necessary speed variation according to load as required by inserting resistance in the rotor circuit e. g. by means of a slip regulator. The use of an induction motor is however attended by the disadvantage of a relatively low power factor.

In many cases it would be an advantage if a synchronous motor could be employed for such a continuously running drive, since by regulation of the motor excitation the power factor of the connected electrical load might be raised, but a synchronous motor cannot be used in conjunction with a load equalizing flywheel owing to its invariable speed characteristic.

Thus according to present practice the use of an induction motor drive with a flywheel gives load equalization, but not power factor correction, whereas on the other hand a synchronous motor drive gives power factor correction, but not load equalization.

According to the present invention a power transmission system comprises a driving motor connected to a load provided with a flywheel, wherein a connection of variable velocity ratio is interposed between the motor and the flywheel.

Many forms of variable gear are known which might be interposed between a constant speed motor and a flywheel to permit changes of speed of the latter, but it is important that the space, weight and cost of the mechanism should be a minimum and that the efficiency should be maximum, also that the maintenance cost should be as low as possible, if the plant is to be economically valuable. Consequently the choice of a suitable variable gear is very limited.

According to the present invention in its preferred form a hydraulic coupling (e. g. a Föttinger type coupling) is arranged between the driving motor and the driven machine, which may be provided with a flywheel, or may be a unidirectional driven machine without a flywheel, and a control device is provided for regulating the amount of slip permitted between the motor and the driven machine in such manner that the full load torque transmitted is substantially constant in value or varies according to a predetermined relationship with the load, speed, or other function of the connected machinery. Thus variation in the speed of the driven machine may be secured irrespective of the speed characteristics of the driving machine, so that, for example, a synchronous motor may be run in conjunction with a flywheel to give the combined advantage of load equalization and power factor correction. It should be noted that in this specification the word "motor" is intended to cover broadly any source of motive power.

In a hydraulic coupling of the hydrokinetic type the transmission of power is considered to be effected primarily by means of the kinetic energy of the contained liquid, and in the case of a Föttinger coupling the "slip" (or loss of revolutions between the primary and the secondary elements) may be of the order of 1½% at normal full load and speed, the efficiency then being 98½%. When transmitting reduced loads the "slip" decreases and the efficiency rises proportionately, the efficiency under light load conditions being very nearly 100%.

The effect of reducing the quantity of liquid in circulation, when the coupling is under load, is to increase the "slip", and vice versa, hence by regulating the quantity of liquid according to requirements, the coupling may be caused to act in an analogous way to the well known "slip regulator" associated with the Ilgner load equalizing system, but with the essential difference that the speed of the driven machine is by this means permitted to vary while the speed of the driving motor remains constant.

In the case where the driving motor is a synchronous machine used for power factor correction, and the flywheel is of considerable mass, and where the variations in load on the driven machine are rapid and continuous (such as is the case with winding engines and rolling mills) it is particularly important to secure rapid and precise variation of the liquid quantity in such manner as to maintain a constant load on the driving motor.

It is found for example that the rate of variation in the "slip" and consequently in the speed of the flywheel is closely dependent on the rate of variation in liquid quantity at any instant for a given torque, hence with a flywheel of large mass, such as is necessary for adequate equalization of load, it may be seen that incorrect regulation of the liquid quantity would result in large and undesirable variations in the load upon the driving motor such as to interfere with the regulation of power factor and possibly cause the machine to fall out of synchronization.

So that the working of the invention may be fully understood, it is desirable to point out that in practical operation there are certain difficulties attending the precise regulation of the liquid quantity and hence of the "slip".

For example the shaft glands, as normally designed to avoid undue shaft friction, permit of considerable leakages of liquid, and similar leakages occur through vent holes, hence for the maintenance of a definite quantity of liquid in circulation internally, it is necessary to counterbalance the losses by an exactly equal supply.

The losses are not however constant owing to the effects of gland wear and variations in the pressure on the glands arising from changes in the quantity of liquid; and furthermore from variations of viscosity of the liquid (e. g. oil) as its temperature rises and falls according to the variations in "slip" energy dissipated in the coupling.

Additional to the above are the variations (particularly when oil is the working fluid), arising from changes in viscosity due to temperature variations, and the resultant effect on the velocity of circulation of the liquid and therefore on the "slip" for a given quantity of liquid. There may also be mentioned the effect of the varying degree of aeration of the liquid resulting from the churning action to which it is subjected.

The invention therefore incorporates regulating gear designed to compensate for the variations encountered in practice in such manner that the quantity of liquid in circulation is so regulated as to secure precisely the desired percentage "slip" at all times.

In the case of electrically driven machinery the control of the liquid may be effected by means of a torque motor energized by suitable transformers in the driving motor circuit, and arranged to operate a valve or valves, which may be spring controlled, regulating the inflow or exhaust (or both) of liquid to and from the coupling. If desired the regulating valve may be controlled by other means, for example by means of a mechanical torque governor.

The normal action of the regulating gear will be to regulate the liquid quantity, and accordingly the "slip", so that the full load torque transmitted is within close limits, a constant figure which may be adjusted as required, for example by varying the setting of the valve, varying the adjustment of the controlling spring, or varying the resistance in the rotor circuit of the torque motor.

If the circumstances make it desirable that the full load torque or power transmitted should bear a definite relationship to the load, speed, pressure or other function of the connected machinery, mechanism may be provided whereby variation of the valve setting, spring compression, rotor resistance or other regulating means is effected by a device responsive to the speed or pressure or other desired function, (e. g. by means of a centrifugal governor or fluid pressure operated piston and cylinder mechanism).

The invention is illustrated in the accompanying drawings in which

Figure 1:
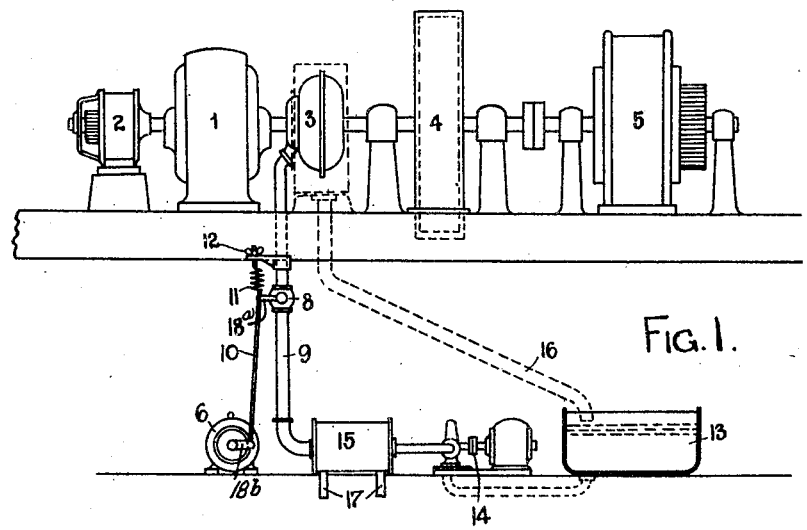
Fig. 1 shows diagrammatically a power plant in accordance with the invention.
Figure 2:
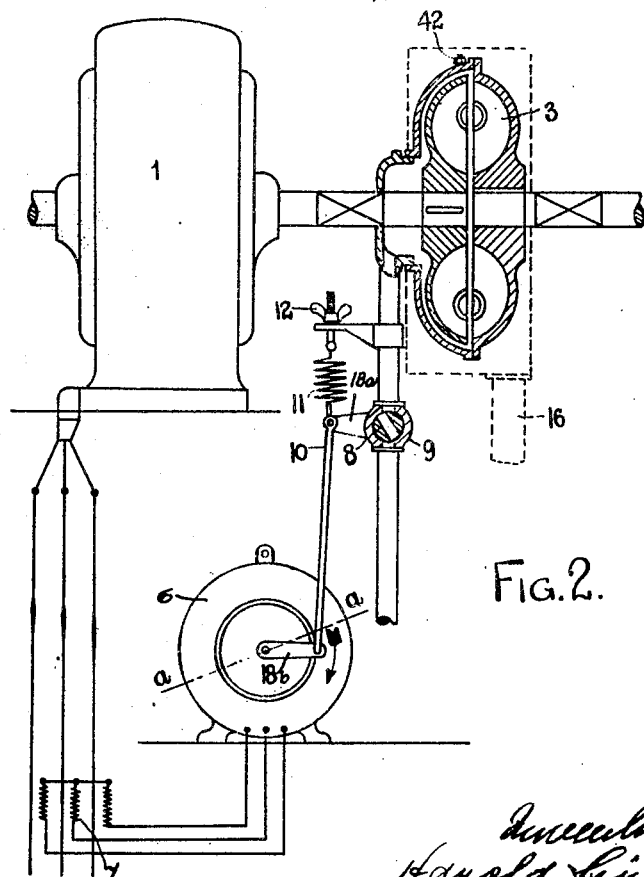
Fig. 2 is a detail view showing part of the apparatus of Fig. 1 to a larger scale.

Referring to Figs. 1 and 2, a synchronous motor 1 provided with an exciter 2 is connected through a hydraulic coupling 3 to a flywheel 4 and Ward Leonard generator 5, this being a typical application. The hydraulic coupling is provided with an outlet valve 42 which may be adjustable.

The control in this case is arranged (by way of example) on the inlet to the coupling and is effected by means of a torque motor 6 in circuit with a current transformer 7 in the circuit of the main motor 1 as shown in Fig. 2. The torque motor 6 is in connection with the valve 8 in the inlet pipe 9 by means of the arms 18a and 18b and the rod 10 and a spring 11 is provided which tends to open the valve 8. Means 12 are provided for adjusting the tension of the spring 11. Liquid is pumped from a sump tank 13 by means of the pumping set 14 through a cooler 15 and through the inlet pipe 9 to the coupling, whilst the outlet pipe 16 returns the liquid to the sump tank 13. The pumping set 14 is adapted to supply the liquid to the coupling at sufficient pressure to overcome the back pressure due to the rotating body of liquid within the coupling. The capacity of the pumping set 14 (which is preferably a centrifugal pump since the valve 8 is arranged on the delivery side) is considerably in excess of the capacity required simply to overcome the leakage losses since the pump must be capable of filling the coupling in addition to overcoming the leakage losses. Cooling water is circulated in the cooler 15 through pipes 17. The cooler is for the purpose of abstracting from the liquid the heat generated in the coupling in consequence of the "slip".

The method shown, by which the liquid discharged from the coupling and collected in the casing thereof is returned to a sump tank, is particularly suitable when oil or other valuable liquid is the working medium. If desired, the coupling may be supplied with water from an overhead tank or direct from supply mains in which case the exhaust may be run to waste and no cooler will be required.

If preferred the torque motor 6 may have a current and a potential winding energized respectively by current and potential transformers in the main motor circuit and so arranged that on increase of load the torque motor acts in the direction of the arrow in Fig. 2 to increase the "slip" of the coupling, and vice versa; also upon regeneration with energy passing from the main motor to the line, the torque motor acts in the reverse direction i. e. to decrease "slip" by filling the coupling.

The control may if desired be arranged on the outlet side of the coupling and may for example be in the form of a ring valve surrounding the coupling near its point of maximum diameter, and rotating with it. The ring is slidable axially, and when in the closed position covers a series of exhaust ports in the rotating coupling; when it is moved to the open position it uncovers the holes and the liquid is ejected by centrifugal force. This arrangement is not illustrated in the drawings, but is shown in my prior Patent 1,768,938, issued July 1, 1930.

If desired, for quick regulation, the control may be effected by means of valves coupled together and arranged in both the inlet and the outlet pipes, but the preferred mechanical arrangement, on account of its simplicity, is the regulation of the inlet valve as illustrated.

The working of the apparatus is as follows, oil being taken as the working medium.

When the equipment is running light, the input to the motor 1 is small and consequently the rotor of the torque motor 6 is in the light load position (that is to say the centre line of the arm 18b is in the position indicated by the dotted line a—a in Fig. 2), the inlet valve 8 is wide open and the coupling 3 is maintained full of liquid by the action of the pump 14, the "slip" being practically nil.

As the load on the driven machine 5 increases, additional power is transmitted by the hydraulic coupling 3 in which the "slip" will increase by the negligibly small amount obtained with a full coupling, (say 1½% at full load).

When the load on the driving motor 1 reaches the normal full load for which the slip regulator is set however, the torque motor 6 will have deflected in the direction of the arrow against the action of the spring 11 thus partially closing the inlet valve 8, and the point will then be reached (when the equipment is correctly adjusted) when the area through the valve 8 is sufficient to admit just enough oil to balance the sum of the leakage losses (intentional and otherwise) from the coupling the liquid quantity therein remaining constant, i. e. full.

Further increase of load on the driven machine 5 and on the driving motor 1 will result in further deflection of the rotor of the torque motor 6 and further restriction of the valve area, so that the oil inflow will be restricted and the coupling will commence to empty since the oil outflow remains a substantially constant quantity.

In consequence of the partial emptying of the coupling the "slip" will increase with the result that the speed of the flywheel 4 will fall thus giving up some of its stored energy to the driven machine 5. At the same time, in consequence of the increased "slip" of the coupling, the load on the driving motor 1 will tend to fall with the result that the deflection of the rotor of the torque motor 6 will be reduced and the oil inflow increased momentarily so as to check the rate of emptying of the coupling 3 and maintain the load on the driving motor 1 nearly constant.

Subsequent increase of load will again result in torque motor deflection and increase of "slip" enabling the flywheel to give up further stored energy, while the torque transmitted by the coupling will remain more or less constant due to the action of the torque motor in controlling the oil flow. Decrease of load on the driving machine 5 will result in an acceleration of the flywheel 4 since the torque input through the coupling is being maintained, but the increased flywheel speed, that is, reduced "slip", will result momentarily in a reduction in the load on the driving motor 1 with the result that the torque motor 6 will immediately increase the oil inflow so as to maintain the load on the driving motor 1 while the "slip" decreases and the flywheel 4 continues to accelerate until full speed is reached and the coupling is full, after which the load on the driving motor 1 will fall and the torque motor 6 will return towards the light load position.

If under certain conditions (e. g. when a load is being lowered regeneratively on a Ward Leonard winding engine) power is returned from the driven machine, this will result in an acceleration of the flywheel, and when full speed is reached the coupling will be full, as noted above. Further increase of flywheel speed will cause regenerated power to be returned through the coupling to the driving motor, and this will result in the latter acting as a generator and returning energy to the line. Provided the torque motor has two windings (current and potential) as referred to above, or is provided with other means to prevent its deflecting in the normal direction under reverse power conditions, the coupling will remain full and the flywheel speed will be prevented from rising more than a few per cent above normal, the surplus regenerative energy being returned to the line.

Figure 3:
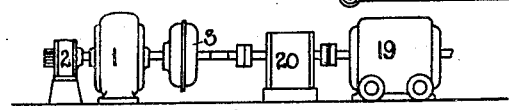
Figs. 3 to 5 are diagrams illustrating modified forms of the invention.
Figure 4:
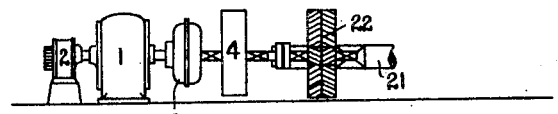
Figure 5:
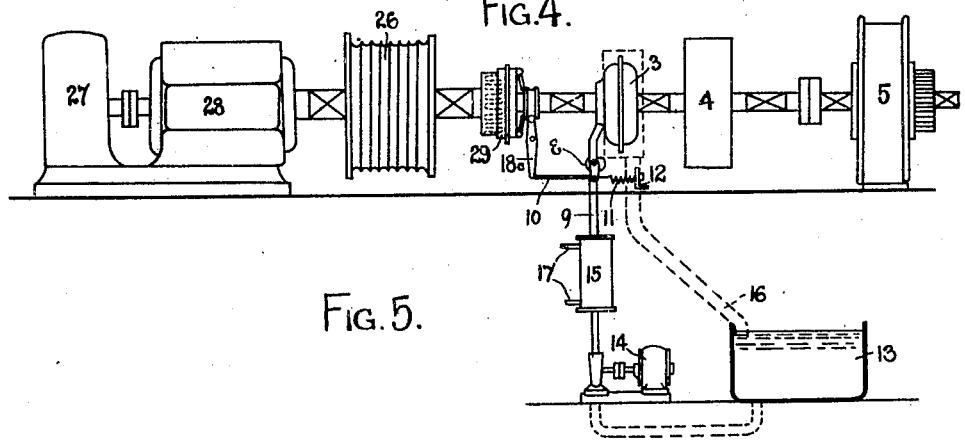

Figs. 3 to 5 show some alternative arrangements of the hydraulic slip regulator, Fig. 3 illustrating a drive from a constant speed motor 1 to a high speed rotary compressor 19 of which it is desired to vary the speed as desired to regulate the output. A gear box 20 is provided between the hydraulic coupling 3 and the compressor 19.

Fig. 4 shows an arrangement suitable for use with a non-reversing rolling mill driven by a constant speed motor 1, a flywheel 4 being provided on the high speed shaft to take the peak loads and the rolling mill being driven by the slow speed shaft 21 through gearing 22.

Fig. 5 shows an arrangement in which a variable speed drive is required from a constant speed source of motive power. The plant illustrated is a main mill drive (rope pulley 26 driven by a turbine 27 through a reduction gear box 28) to which is connected through a hydraulic coupling 3 a machine such as a Ward Leonard generator 5 and flywheel 4 of which a variation in speed is desired.

Figure 6:
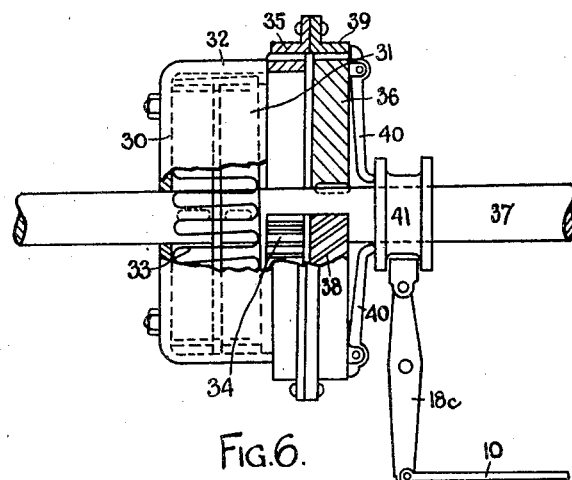
Fig. 6 is a detail view of the torque governor shown in Fig. 5.

In this case the prime motive power is not electrical and a torque motor cannot be employed. Accordingly the control of the "slip" is effected by a mechanical torque governor 29 shown in more detail in Fig. 6.

The mechanical torque governor 29 consists of a Wellman-Bibby coupling (or other resilient coupling giving the requisite characteristics) and use for control purposes is made of the angular deflection between the driving half 30 and the driven half 31 of the coupling when transmitting power.

As will be seen, the casing 32 enclosing the sinuous spring 33 connecting the two halves of the coupling is provided with straight teeth 34 on its periphery, and a ring 35 rotating with the casing 32 (which is fixed to the driving half 31 of the coupling) engages these teeth. Adjacent to the toothed part of the casing is mounted a disc 36 keyed to the driven shaft 37 and this disc is provided with helical teeth 38 at an angle of say 45°, to the axis and a toothed ring 39 rotating with the disc 36 engages these helical teeth. The rings 35 and 39 on the driving and driven elements respectively are bolted together with the result that angular deflection between the two halves 30 and 31 of the coupling results in axial movement of the rings 35 and 39. This axial movement is transmitted by the levers 40, which magnify the movement to a sliding sleeve 41 which is connected to the inlet or exhaust valves (or both) of the coupling through the pivoted lever 18c and the rod 10.

As will be seen the control of the liquid quantity and of the "slip" is similar with the mechanical torque gear to that obtained with the electric torque motor.

In Figs. 1, 2 and 5 the valve spring 11 is shown in each case with an adjusting arrangement 12 by means of which the slip regulator load setting may be varied.

It will be seen that a characteristic of the invention is the transmission of a constant full load torque equivalent to the maintenance of a constant load on the driving motor, this torque being adjusted as required by means of the arrangement 12.

Various mechanical elements or devices, such as centrifugal governors, electric resistances, valves, adjusting screws, etc., well-known in the art, may be employed for operating the liquid controlling valve or other member of the coupling to secure a predetermined relationship between the torque transmitted and the speed, pressure or other desired function of the connected machinery.

I claim:

1. Power transmission system comprising a driving motor, a load, a connection of continuously variable velocity ratio including a hydraulic coupling between said motor and said load, a fly wheel adapted to be driven by said motor and disposed upon the same side of said connection as said load, and means for automatically varying the slip of said coupling in accordance with variations in the load to permit said motor to run at substantially constant speed, said fly wheel to run at varying speeds, and the torque on the motor to be maintained within predetermined limits.

2. Power transmission system comprising a driving motor, a load, a connection of continuously variable velocity ratio including a hydraulic coupling between said motor and said load, a fly wheel adapted to be driven by said motor and disposed upon the same side of said connection as said load, and means for automatically controlling the velocity ratio of said connection to maintain a substantially constant torque on said driving motor during fluctuations in the magnitude of said load.

3. Power transmission system comprising a driving motor, a driven machine, a hydraulic coupling between said motor and said machine and permitting a continuous slip, a fly wheel adapted to be driven by said motor and disposed upon the same side of said coupling as said load and means adapted to automatically regulate the amount of slip permitted in said coupling, in predetermined relation to some function of said machine.

4. Power transmission system comprising an electric synchronous motor, a driven machine, a hydraulic coupling between said motor and said machine, a fly wheel adapted to be driven by said motor and disposed upon the same side of said coupling as said load and means adapted to regulate the amount of slip in said coupling, said means being operated in predetermined relation to some function of the connected machinery.

5. Power transmission system comprising an electric synchronous motor, a unidirectional driven machine, a hydraulic coupling of the Föttinger type between said motor and said machine and permitting leakage, means for supplying liquid to said coupling at a rate in excess of the rate of leakage, and means operated in predetermined relation to some function of the connected machinery, adapted to regulate the liquid content of said coupling and automatically maintain a substantially constant torque on said motor.

6. Power transmission system comprising a driving motor, a driven machine, a hydraulic coupling between said motor and said machine and having liquid inlet and outlet means, a fly wheel adapted to be driven by said motor and disposed upon the same side of said coupling as said load, and means adapted to regulate the quantity of fluid in circulation in said coupling in predetermined relation to some function of the connected machinery.

7. Power transmission system comprising a driving motor, a driven machine, a hydraulic coupling of the hydrokinetic type between said motor and said machine, a fly wheel adapted to be driven by said motor and disposed upon the same side of said coupling as said load and means adapted to regulate the quantity of fluid in circulation in said coupling in predetermined relation to some function of the connected machinery to thereby control the slip in said coupling.

8. Power transmission system comprising a driving motor, a driven machine, a hydraulic coupling permitting continuous slip between said motor and said machine, a fly wheel adapted to be driven by said motor and disposed upon the same side of said coupling as said load, and means responsive to the load upon said motor adapted to regulate the amount of slip in said coupling.

9. Power transmission system comprising a driving motor, a driven machine, a hydraulic coupling between said motor and said machine, a flywheel driven by said motor and disposed upon the same side of said coupling as said load, a mechanical torque governor connected to said driving motor, and means operated thereby for regulating the quantity of liquid in circulation in said coupling in predetermined relation to some function of the connected machinery.

10. Power transmission system comprising a driving motor, a driven machine, a hydraulic coupling between said motor and said machine, a fly wheel adapted to be driven by said motor and disposed upon the same side of said coupling as said load, a mechanical torque governor, responsive to the load on said motor, and means operated thereby to increase or decrease the quantity of liquid in circulation in said coupling in accordance with the torque on the motor.

11. Power transmission system comprising a driving motor, a driven machine, a hydraulic coupling of a type permitting continuous variable slip between said motor and said machine, a fly wheel adapted to be driven by said motor and disposed upon the same side of said coupling as said load and means adapted to increase or decrease in predetermined relation to some function of the connected machinery the value of the full load torque which said coupling may transmit.

12. Power transmission system comprising a driving motor, a driven machine, a hydraulic coupling having continuous leakage between said motor and said machine, a fly wheel driven by said motor and disposed upon the same side of said coupling as said load, means for delivering liquid to said coupling and means for regulating the rate of flow of liquid into said coupling in predetermined relation to some function of the connected machinery.

13. Power transmission system comprising a driving motor adapted to run at a substantially constant speed, a load subject to intermittent peaks, a hydraulic coupling of the hydrokinetic type between said motor and said load and permitting continuous slip, a fly wheel adapted to be driven by said motor and disposed upon the same side of said coupling as said load and means responsive to the load upon said motor adapted to automatically regulate the amount of slip permitted in said coupling.

14. Power transmission system comprising a driving motor adapted to run at a substantially constant speed, a load subject to intermittent peaks, a hydraulic coupling of the hydrokinetic type between said motor and said load and permitting continuous slip, a fly wheel adapted to be driven by said motor and disposed upon the same side of said coupling as said load and a mechanical torque governor adapted to increase or decrease the quantity of liquid in circulation in said coupling in predetermined relation to some function of the connected machinery to thereby regulate the slip.

15. A power transmitting system including a driving motor adapted to run at a substantially constant speed, a hydraulic coupling of the Föttinger type connected to said motor for transmitting power from the latter, said coupling permitting continuous variable slippage and having a liquid inlet and a liquid outlet, means for delivering liquid to said inlet, and means for varying the rate of liquid supply in respect to the rate of liquid discharge to vary the slippage in accordance with the load upon the motor to maintain substantially constant torque on the motor.

16. A power transmitting system, including a driving motor adapted to run at a substantially constant speed, a hydraulic coupling of the Föttinger type connected to said motor for transmitting power from the latter, said coupling permitting continuous variable slippage and having a liquid inlet and a liquid outlet, a machine driven by said coupling, and means for automatically varying the relative rates of liquid inflow and outflow of said coupling to vary the slippage in accordance with the load on the motor and permit the machine to run at varying speeds with substantially constant torque on the motor.

17. A power transmitting system, including a driving motor adapted to run at a substantially constant speed, a hydraulic coupling of the Föttinger type connected to said motor for transmitting power from the latter, said coupling permitting continuous variable slippage and having a liquid inlet and a liquid outlet, a fly wheel driven by said coupling, and a torque responsive device for controlling the relative rates of liquid inflow and outflow of the coupling and thereby controlling the slip of the coupling to automatically cause the fly wheel speed to vary independently of the speed of the motor and allow the fly wheel to equalize the load on the motor.

In testimony whereof I have signed my name to this specification.

HAROLD SINCLAIR.